US012656071B2

(12) United States Patent
Bernard et al.

(10) Patent No.: US 12,656,071 B2
(45) Date of Patent: Jun. 16, 2026

(54) METHOD AND CLEANING DEVICE FOR CLEANING THE INTERIOR OF A PIPE

(71) Applicant: LOBBE INDUSTRIESERVICE GMBH & CO KG, Iserlohn (DE)

(72) Inventors: Adrian Bernard, Iserlohn (DE); Bodo Skaletz, Dinslaken (DE); Reinhard Eisermann, Iserlohn (DE)

(73) Assignee: LOBBE INDUSTRIESERVICE GMBH & CO KG, Iserlohn (DE)

( * ) Notice: Subject to any disclaimer, the term of this patent is extended or adjusted under 35 U.S.C. 154(b) by 154 days.

(21) Appl. No.: 18/263,207

(22) PCT Filed: Jan. 27, 2022

(86) PCT No.: PCT/EP2022/051839

§ 371 (c)(1),
(2) Date: Jul. 27, 2023

(87) PCT Pub. No.: WO2022/167306

PCT Pub. Date: Aug. 11, 2022

(65) Prior Publication Data

US 2024/0093953 A1 Mar. 21, 2024

(30) Foreign Application Priority Data

Feb. 3, 2021 (DE) ......................... 102021102411.0

(51) Int. Cl.

| | |
|---|---|
| ***B08B 9/043*** | (2006.01) |
| ***B08B 9/049*** | (2006.01) |
| ***F28G 1/16*** | (2006.01) |
| ***F28G 15/00*** | (2006.01) |

(Continued)

(52) U.S. Cl.
CPC ............ *F28G 15/08* (2013.01); *B08B 9/0433* (2013.01); *B08B 9/0495* (2013.01); *F28G 15/003* (2013.01); *F28G 15/04* (2013.01); *B08B 2209/04* (2013.01); *F28G 1/163* (2013.01)

(58) Field of Classification Search
CPC ......... F28G 1/16–163; F28G 3/16–163; B08B 9/027–057
See application file for complete search history.

(56) References Cited

U.S. PATENT DOCUMENTS

| | | | | |
|---|---|---|---|---|
| 5,619,771 | A | 4/1997 | Minic | |
| 2013/0287943 | A1* | 10/2013 | Kreiselmaier ..... | B65H 75/4407 427/236 |
| 2018/0281030 | A1* | 10/2018 | Eisermann ............ | B01D 29/66 |

(Continued)

FOREIGN PATENT DOCUMENTS

| | | | |
|---|---|---|---|
| DE | 3418835 | A1 | 11/1985 |
| DE | 102014104356 | A1 | 10/2015 |

(Continued)

*Primary Examiner* — Kaj K Olsen
*Assistant Examiner* — Richard Z. Zhang
(74) *Attorney, Agent, or Firm* — Hudak, Shunk & Farine Co. LPA

(57) ABSTRACT

A method for cleaning the interior of a pipe using a cleaning device which has a tube. The tube is set into an axial movement along a main axis H within the pipe, and the insertion depth E of the tube into the pipe is detected. It is determined whether the tube has reached an end position, and the axial movement is terminated when the tube reaches the end position.

10 Claims, 4 Drawing Sheets

(51) Int. Cl.
*F28G 15/04* (2006.01)
*F28G 15/08* (2006.01)

(56) References Cited

U.S. PATENT DOCUMENTS

| | | | | |
|---|---|---|---|---|
| 2020/0056851 | A1* | 2/2020 | Watkins | F28G 15/003 |
| 2020/0132402 | A1* | 4/2020 | Schneider | F28G 15/04 |

FOREIGN PATENT DOCUMENTS

| | | | | |
|---|---|---|---|---|
| EP | 3757504 | A1 | * | 12/2020 |
| GB | 2525496 | A | * | 10/2015 |
| JP | 2020014982 | A | * | 1/2020 |
| WO | WO2013135622 | A1 | * | 9/2013 |
| WO | 2015144889 | A1 | | 10/2015 |

* cited by examiner

METHOD AND CLEANING DEVICE FOR CLEANING THE INTERIOR OF A PIPE

FIELD OF THE INVENTION

The present invention relates to a method for cleaning the interior of a pipe, in particular a pipe having front-facing open ends, and to a cleaning device.

BACKGROUND OF THE INVENTION

Pipes with front-facing open ends are used in heat exchangers, condensers, and air coolers, for example. There, the pipes can be grouped into so-called pipe bundles. In operation, the pipe ends are connected to a circuit through which a medium, for example a coolant, is directed. From time to time, the pipes will need to be cleaned, because deposits and/or soiling will form within the pipes, typically originating from the media directed through the pipes. If the deposits are too large, sufficient medium can no longer be passed through the pipes, or a pipe is clogged completely.

Methods and devices for cleaning the interior of pipes with front-facing open ends are already known from the prior art.

For example, WO 2015/144889A1 discloses a method and a device for cleaning bundles of pipes in which a cleaning device with a cleaning unit is provided. The cleaning unit has a high-pressure tube that is pushed into a pipe using an advancing unit. The advancing unit has a drive roller and a pressing roller for this purpose. The high-pressure tube (HP tube) has a nozzle at its front end. Liquid is passed through the tube under high pressure and flows out of openings of the nozzle, which can remove contaminants in the pipe. The liquid flowing out of the openings of the nozzle in the form of jets pulverises the contaminants and releases them from the inside of the pipe.

A further device for cleaning tube bundles is known from DE 34 188 35 C2.

When cleaning, it should be noted that the fluid jet exiting the front end of the tube can cause damage to surrounding equipment and injuries to surrounding personnel if the nozzle is not positioned in the pipe. The problem addressed by the invention was to prevent such damage and injuries.

SUMMARY OF THE INVENTION

This problem is solved by a method for cleaning the interior of a pipe by means of a cleaning device comprising a tube that is set into an axial movement along a main axis H within the pipe, and wherein an insertion depth E of the tube into the pipe is detected wherein it is determined whether the tube has reached an end position and terminating the axial movement when the tube reaches the end position, as well as a cleaning device comprising a tube and an advancing unit for moving the tube along a main axis H of the advancing unit, wherein the advancing unit has a drive which is frictionally connected to the tube and by means of which the tube can be set into an axial movement along the main axis (H), wherein the cleaning device comprises a controller for controlling the drive and wherein-the controller is configured so as to determine whether the tube has reached an end position and to terminate the axial movement when the tube reaches the end position.

In the method according to the invention, the tube within the pipe is set into an axial movement along a main axis H, wherein an insertion depth E of the tube into the pipe is detected. According to the invention, it is determined whether the tube has reached an end position, and the axial movement is terminated when the tube reaches the end position.

The cleaning device according to the invention has a tube and an advancing unit for moving the tube along a main axis H of the advancing unit, wherein the advancing unit has a drive that is frictionally connected to the tube and by means of which the tube can be set into an axial movement along the main axis H. The cleaning device comprises a controller for controlling the drive. The controller is configured so as to determine whether the tube has reached an end position and to terminate the axial movement when the tube reaches the end position.

The cleaning device preferably comprises a monitoring device connected to the controller, which is configured so as to detect the insertion depth E of the tube into the pipe. The controller is further configured so as to compare the detected depth of insertion with a target value and thus determine whether the tube has reached an end position. Additionally or alternatively, the cleaning device comprises at least one end switch unit connected to the controller and configured so as to detect the reaching of an end position of the tube. If the cleaning device comprises a monitoring device and an end switch unit, the reaching of the end position is determined redundantly.

Thus, prior to cleaning the pipe, one or more end positions of the tube can be set, wherein movement of the tube is automatically terminated when it reaches one of the end positions. This ensures that the tube is not moved beyond the end positions by the drive. Thus, the tube or its nozzle does not reach areas where the liquid jet can lead to damage or injury. In particular, it can be prevented that the nozzle is moved out of the tube at one or both ends.

The advantages according to the present invention arise both in fully automatic operation and in semi-automatic operation. In fully automatic operation, the controller controls the drive according to a defined plan. In semi-automatic operation, operators manually actuate buttons to advance and retract the tube, resulting in corresponding drive actuation by the controller. If the tube is now moved to the end position undesired or due to a fault, the drive is automatically deactivated. In this way, damage and injuries are avoided.

A tube differs from a cleaning lance primarily due to its elasticity, which allows non-straight pipes to also be cleaned. A cleaning lance is rigid. Only straight pipes can be cleaned with a cleaning lance. The tube is preferably an HP tube. Preferably, the tube is at least partially made of a plastic, in particular an elastomer. The tube can have a reinforcement insert, in particular a wire insert. It is particularly advantageous for the tube to be at least partially made from rubber.

The tube is preferably connected to a source for a cleaning medium, in particular a source that provides water at high pressures of up to 3000 bar.

Preferably, at a front end of the pipe, a nozzle having one or more cleaning medium exit holes is provided.

The end position, for which it is determined whether the tube has reached it, can be a first end position in which the tube at least partially extends into the pipe, or a second end position in which the tube is completely outside of the pipe. The first end position is usually a position in which the tube extends through the entire pipe, i.e. to a rear end of the pipe. However, the end positions can also be selected such that in both cases the nozzle is arranged in the pipe and is located in the first end position at the rear end and in the second end position at a front end of the pipe. In this case, it is completely avoided that liquid flows out of the nozzle outside the pipe under high pressure.

Preferably, it is determined whether the tube has reached an end position by detecting an abutment of the tube on an end switch. The abutment of the tube is a single event and its detection is more reliable than, for example, determining the end position via the insertion depth E. The end switch is preferably part of the end switch unit of the cleaning device.

Preferably, each end switch unit of the cleaning device comprises an abutment element mounted on the tube and an end switch mounted on the advancing unit, wherein the end switch unit is configured so as to transmit an end switch signal to the controller when the abutment element abuts the end switch. The controller can then deactivate the drive. The position of the abutment element mounted on the tube is easily adjusted, thereby defining the end position of the tube. Preferably, the abutment element is comprised of two or more parts that define an aperture that can be laid around the tube and connected to one another such that there is a frictional connection between the tube and the abutment element.

Preferably, the end switch comprises at least one hollow shaft biased in the axial direction, wherein the tube passes through the hollow shaft. The end switch can additionally comprise a fork-shaped stopper part. In particular, the fork-shaped stopper part has an aperture that is larger than the cross-section of the tube but smaller than the cross-section of a nozzle mounted on the tube and/or a pressing of the nozzle and tube. In this way, the nozzle and/or the pressing to a certain extent sticks on the fork-shaped stopper part and releases the end switch in this way.

Preferably, the bias of the hollow shaft is carried out by a compression spring. In this way, the stopping of the stop element is dampened at the end switch. This reduces the likelihood that the abutment element will detach from the tube.

The end switch preferably comprises a sensor connected to the controller, wherein the sensor is configured so as to detect a movement of the hollow shaft counter to the bias. If the stop element meets the hollow shaft, the hollow shaft is moved counter to its bias, which is detected by the sensor. The sensor then transmits the end switch signal to the controller, and the controller deactivates the drive.

The sensor is preferably an inductively measuring sensor. If used as intended, the tube and other components of the cleaning device can become soiled. Inductively measuring sensors are insensitive to such soiling.

The hollow shaft preferably comprises a recess at which the sensor is aimed. The recess preferably extends perpendicular to the main axis H. Upon a movement of the hollow shaft, the recess is moved away from the sensor, whereby the measurement signal of the sensor changes. This change is transmitted as an end switch signal to the controller.

Particularly preferably, two end switch units are provided, each with a hollow shaft biased in the axial direction, a stop element and a sensor, wherein the hollow shafts are biased in the opposite direction. In this way, two end positions, a start and an end position, are set for the movement of the tube.

Preferably, during the axial movement, the distance A of the tube from a target value associated with the end position in whose direction the tube moves is continuously determined, and an advancing speed of the axial movement is set as a function of the determined distance A. The distance A is determined from the detected insertion depth E and the target value associated with the end position. The direction of movement of the tube is provided by the cleaning device by means of the drive. The distance A is advantageously calculated as the difference between the target value of the end position in which the tube is moving and the currently detected insertion depth E. If the distance A is $\leq 0$, the axial movement is advantageously terminated, i.e., the advancing speed is set to zero. The target value of the end position can in turn be calculated from the length of the pipe to be cleaned in conjunction with a start position in which the nozzle enters the pipe, possibly minus a safety length, and programmed into the controller or monitoring device.

If both a determination of the distance A and a dependent control of the axial movement as well as a determination of the abutment of the tube is provided, the approach of the end position can be monitored redundantly.

Preferably, the advancing speed is set to a constant first value W1 at a distance of $A>50$ cm and to a constant second value $W2<W1$ at a distance of $A\leq 50$ cm. Thus, the tube is moved slower near the end positions than in centre areas of the pipe. This reduces the impact of the abutment of the tube on the end switch. In this way, in particular, the abutment element is prevented from detaching from the tube upon abutment on the end switch. In addition, at the moment of abutment, less slip between the drive and the tube occurs due to the lower speed, as well as less abrasion on the tube caused by friction between the drive and the tube.

Alternatively, the second value W2 can be selected as a function of the distance A, wherein W2 decreases with decreasing distance A. In this way, the axial movement is evenly lowered. However, the second value W2 should not fall below a certain extent, because with very low axial movements, the pipe can be damaged due to the prolonged effect of the liquid jet. Particularly preferably, a lower limit of $0.5\cdot W1$ is therefore provided for the second value W2.

Independently thereof, the drive speed is preferably between 1 mm/s and 500 mm/s. The values W1 and W2 are preferably in this range.

Preferably, in the event that an abutment of the tube at an end switch is detected, it is determined whether the determined insertion depth E is in a specified tolerance range around a target value associated with the end position. In addition, preferably at least one of the following actions is performed when the insertion depth E is outside the tolerance range:

- the target value is redefined based on the determined insertion depth E;
- an entry is stored in a database indicating that the insertion depth E was outside the range;
- a perceptible signal, in particular an acoustic signal or a light signal, is output;
- the cleaning is discontinued.

Ideally, the determined insertion depth E is exactly the specified target value. In this case, no further action is necessary, wherein a corresponding entry can also be stored in the database in such a case. The database is part of the controller. However, the determined insertion depth E and the target value can actually deviate from one another. One reason can be a slip of the abutment element on the tube. The insertion depth E of the tube would then be determined correctly, whereas the deactivation of the drive is done at an incorrect time. Another reason for a deviation can be slip between the drive train and the tube, which leads to a faulty determination of the insertion depth E. In any case, it is advantageous to point out deviations between the insertion depth E and the target value to the operators of the cleaning device, so that the operators can take appropriate measures to check the functionality of the cleaning device and, if necessary, to repair it.

The type of action can be made as a function of how large the deviation is. For example, in the case of a relatively small deviation, only one entry indicative of this fact need be made in a database. If there is a larger deviation, a signal can be output, and if there is an even larger deviation, cleaning can be discontinued. In this way, operators are alerted to potential problems early on without compromising the functionality of the cleaning device too soon.

Preferably, the drive comprises one or more rollers, which are frictionally connected to the tube. A form-fit connection would require a dedicated pipe, which would make the cleaning device more expensive to manufacture. This is avoided by the frictional connection. Preferably, the rollers are respectively rotatably supported in the advancing unit, in particular about an axis of rotation that runs crookedly to the main axis H and in a plane that is arranged perpendicular to the main axis H. Particularly preferably, a plurality of rollers are provided, each of which can be rotated about an axis of rotation, wherein the axes of rotation run parallel to one another. It is considered particularly advantageous when the rollers are arranged oppositely with respect to the tube. The rollers are then pressed to the tube in opposite directions. This clamps the tube between the rollers, increasing frictional traction and reducing slip. For this purpose, preferably at least one of the two rollers is arranged on an eccentric element. With the eccentric element, the position of this roller and thereby the distance between the rollers can be changed. In this way, the contact pressure can be adjusted and, if necessary, the rollers can be adapted to tubes of different diameters.

Preferably, the drive is automated or semi-automated. Advantageously, the drive for this purpose has a servomotor that drives one or more of the rollers. Preferably, the rollers are coupled together such that only one roller needs to be driven by the servomotor, and all other rollers are driven via the driven roller. A servomotor allows for a precise axial movement of the tube. Particularly preferably, the one roller is driven and the other roller has the eccentric element.

Preferably, the monitoring device of the insertion depth E is at least partially integrated into the servomotor. The insertion depth E is preferably detected by means of a rotary angle measurement unit integrated in the servomotor. The rotary angle measurement unit then forms the monitoring device. In this way, no additional measuring devices are required in order to detect the insertion depth E.

Alternatively or additionally, the monitoring device can comprise a sensor configured so as to detect markings on the tube. Preferably, the markings are applied throughout the tube and at regular intervals from each other. The insertion depth E can be determined by the detection of the markings during the axial movement.

The cleaning device preferably comprises a slip monitoring for detecting slip between the tube and the drive, in particular between the rollers and the tube. This slip distorts the detection of the insertion depth E by means of the servomotor. A slip monitoring determines the extent of the slip, and the value detected as the insertion depth E can then be corrected. The slip monitoring can be realised, for example, by measuring the rotational angle of the servomotor and recording markings on the tube.

The tube is under high pressure during operation. As a result, and due to the axial movement of the tube, portions of the tube that are not in the pipe to be cleaned also move. For reasons of occupational safety, the advancing unit advantageously has a tube guide, which can guide the tube at least in sections. The tube guide also facilitates the alignment of the tube with the pipe to be cleaned. To ensure that the drive can still be frictionally connected to the pipe, it is preferably provided that the tube guide is interrupted in the region of the drive. In this way, the drive can be frictionally connected to the tube while the tube is guided in front of and behind the drive.

A combination of a cleaning device according to the above description and a pipe to be cleaned, which extends along the main axis H, is further disclosed. The tube is in particular open at both ends.

The method according to the invention is preferably carried out using the cleaning device according to the invention.

BRIEF DESCRIPTION OF THE DRAWINGS

The invention is exemplified in the drawings. Shown are.

DETAILED DESCRIPTION OF THE INVENTION

Figure 1:
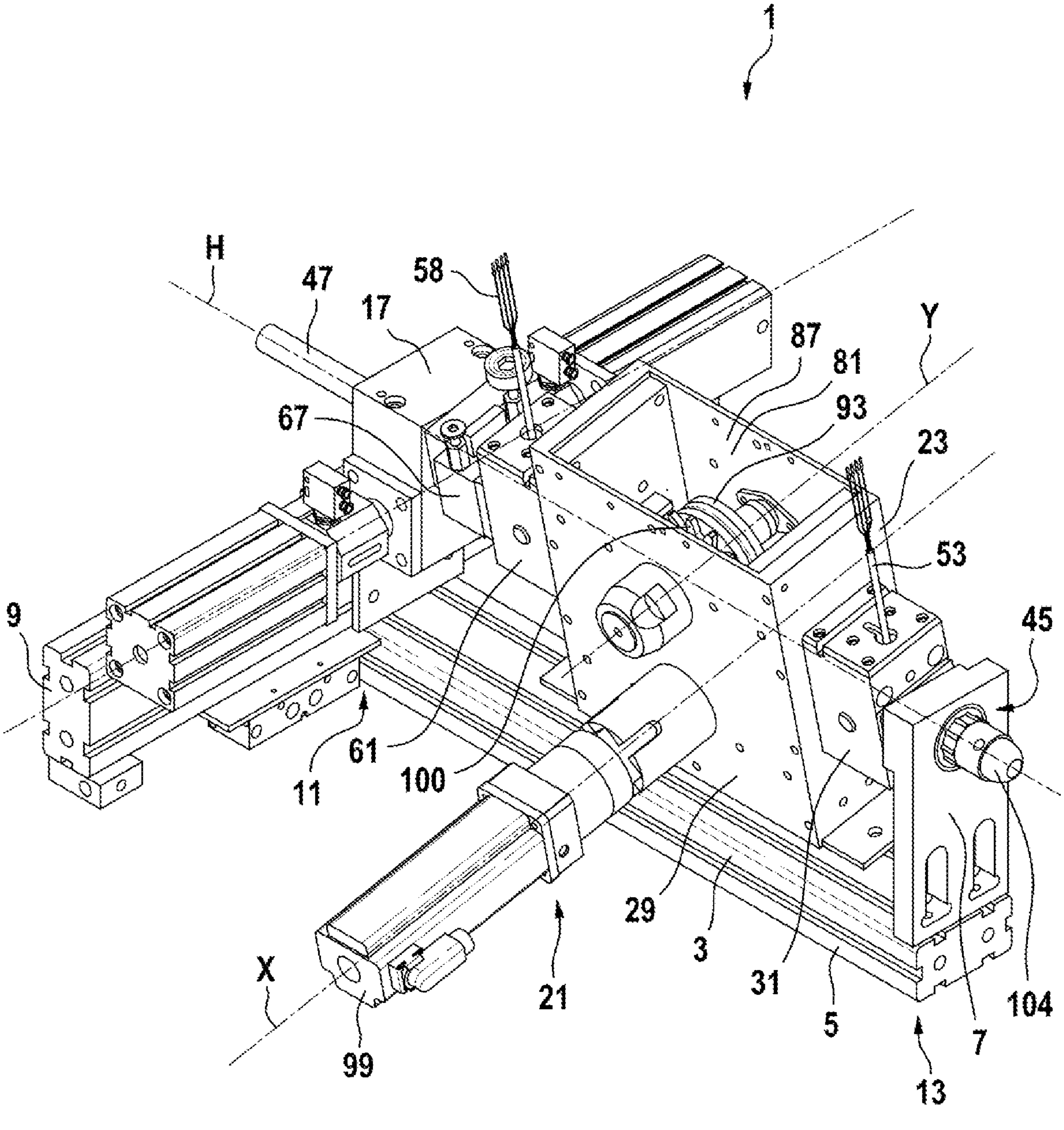
FIG. 1 a perspective view of a first embodiment of a device according to the present invention.
Figure 2:
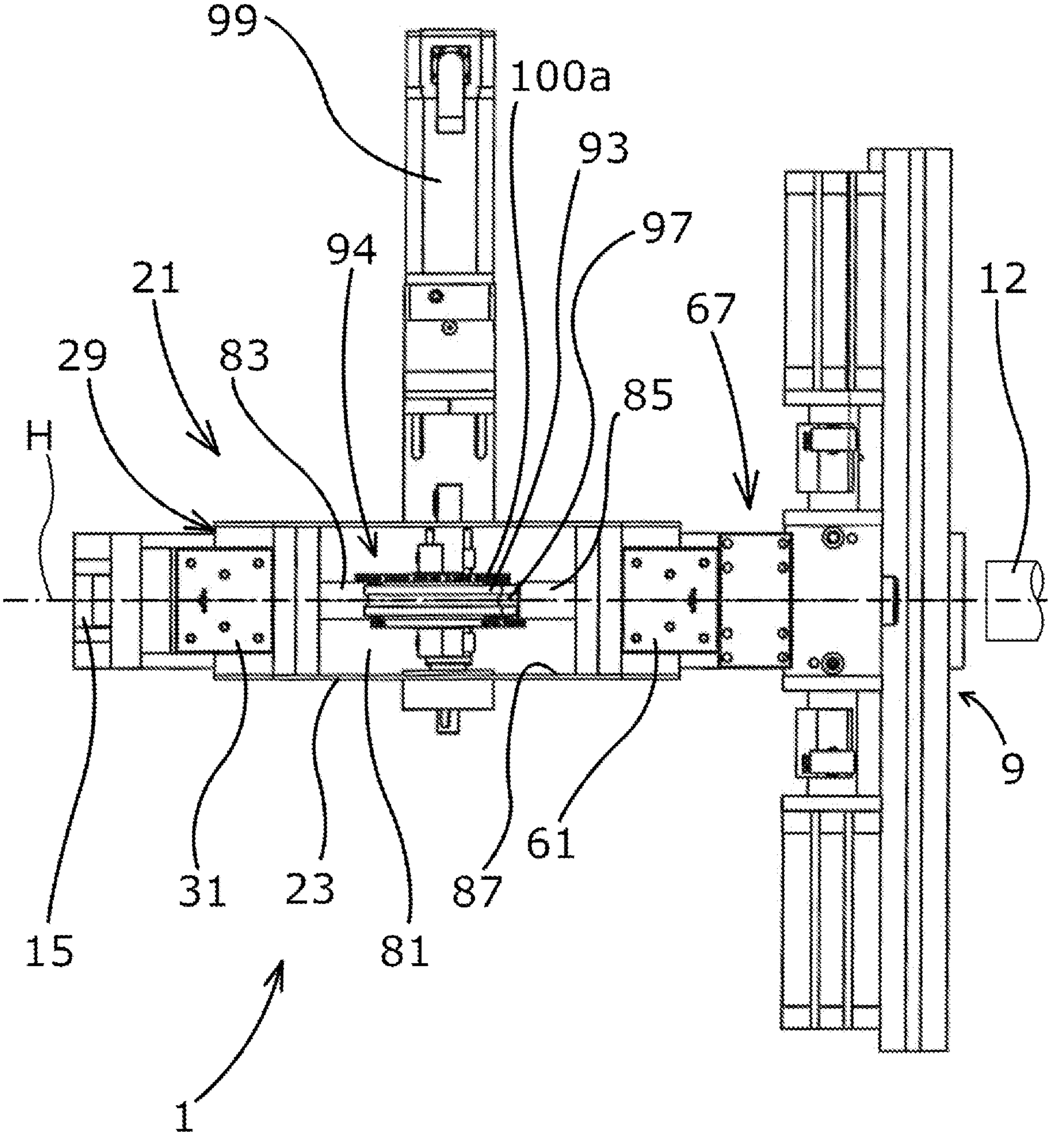
FIG. 2 a plan view of the device according to FIG. 1.
Figure 3:
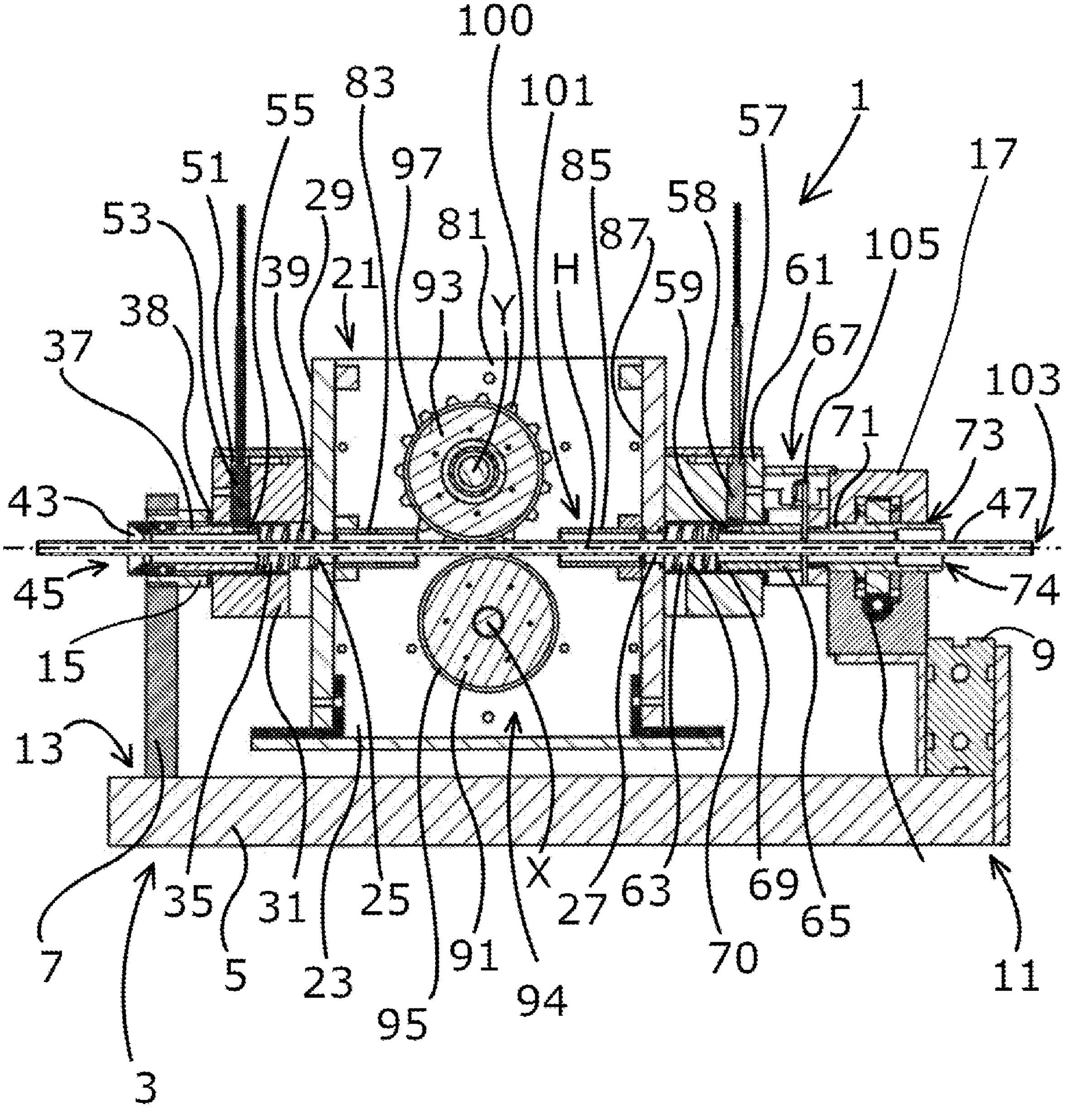
FIG. 3 a vertical section in the longitudinal direction through the device according to FIG. 1.

The cleaning device 1 shown in FIGS. 1 to 3 has a post 3 having a base 5, a pillar 7 and a bracket 9 (see FIG. 1). The pillar 7 and the bracket 9 are arranged along a main axis H on the base 5, wherein the bracket 9 is arranged in a front region 11 of the base 5 and the pillar 7 is arranged in a rear region 13 of the base 5. When used as intended, the front region 11 faces the pipe 12 to be cleaned and the rear region 13 faces away from the pipe 12 (see FIG. 2). The cleaning device 1 further comprises a controller (not shown here).

A plastic bushing 15 is arranged in the pillar 7. The bracket 9 comprises a plastic block 17. The cleaning device 1 further has an advancing unit 21, which is supported in the plastic bushing 15 and the plastic block 17 and thereby rotatably supported in the post 3 about the main axis H.

The advancing unit 21 has a central housing 23 with two coaxial apertures 25, 27 along the main axis H (see FIG. 3). A first guide block 31 is arranged on the outside 29 of the housing 23 and behind the first aperture 25 and is fixedly connected to the housing 23. The first guide block 31 has a first guide bore 35 coaxial to the first aperture 25. A first hollow shaft 37 is arranged in the first guide bore 35. The first hollow shaft 37 is guided in a first bushing 38 such that it is axially displaceable relative to the first guide block 31. A first compression spring 39 is arranged between the first hollow shaft 37 and the outside 29 of the housing 23. The first hollow shaft 37 is rotatably supported in the plastic bushing 15 about the main axis H.

The first hollow shaft 37 has a partially conical bore 43 running along the main axis H, which transitions into a cylindrical bore of the hollow shaft 37 and whose largest inner diameter is provided at one end 45. The conical bore 43 thereby facilitates insertion of a tube 47 into the first hollow shaft 37. The first hollow shaft 37 is thus chamfered by the conical bore 43, thereby avoiding damage to the pipe.

The first hollow shaft 37 together with the first compression spring 39 forms a first end switch for a first end switch unit of the cleaning device 1.

A first sensor bore 51, which is arranged perpendicular to the first guide bore 35 and in which a first sensor 53 of the first end switch unit is arranged, is provided in the first guide block 31. The first hollow shaft 37 has a first recess 55 that cooperates with the first sensor 53. In the illustrated position, the first compression spring 39 is unstressed and the first sensor 53 is aimed at the first recess 55. The first sensor 53 is connected to the controller of the cleaning device 1, whereby the controller can determine in which position the first hollow shaft 37 is located.

A second guide block 61 is arranged on the outside 29 of the housing 23 and in front of the second aperture 27, which is fixedly connected to the housing 23 on the one hand and to a spacer 67 on the other hand. The second guide block 61 has a second guide bore 63 that runs coaxially to the second aperture 27. A second bushing 69 is arranged in the second guide bore 63, in which a second hollow shaft 65 of a second end switch is arranged axially displaceable relative to the second guide block 61. In the axial direction, a second compression spring 70 is arranged between the second hollow shaft 65 of the second end switch and the outside 29 of the housing 23. The second end switch is part of a second end switch unit of the cleaning device 1.

A second sensor bore 57, which is arranged perpendicular to the second guide bore 63, in which a second sensor 58 is arranged, is provided in the second guide block 61. The second hollow shaft 65 has a second recess 59. The second sensor 58 is aimed at the second recess 59 in the illustrated position of the second hollow shaft 65, and the second compression spring 70 is relaxed.

The recesses 55, 59 are located on the outsides of the first and second hollow shafts 37, 65. Thus, they are not in direct contact with the space in which the tube is located. The risk of the recesses 55, 59 becoming soiled is thereby reduced. In other embodiments, a continuous bore having a small diameter can be respectively provided in the recesses 55, 59. Thus, for example, water that collects in recesses 55, 59 can drain.

A third hollow shaft 71 running along the main axis H is connected to the spacer 67 in a rotationally fixed manner and projects out of the spacer 67 on the side of the spacer 67 facing away from the second guide block 61.

The third hollow shaft 71 extends outside the spacer 67 through a bore 73 of the plastic block 17 and projects out of the bore 73 with an end 74 on the side of the plastic block 17 facing away from the spacer 67.

In the interior 81 of the housing 23, two guide sleeves 83, 85 are arranged for the tube 47 (see FIG. 3). The first guide sleeve 83 is arranged on the inside 87 of the housing 23 adjacent to the first aperture 25 such that its bore transitions into the first aperture 25. The second guide sleeve 85 is arranged on the inside adjacent to the second aperture 27 such that its bore transitions into the second aperture 27. Both guide sleeves 83, 85 run coaxially to the main axis H.

In order to move the tube 47 axially, the advancing unit 21 has a drive roller 91 and a pressing roller 93 in the interior 81 of the housing 23. The rollers 91, 93 are each rotatable about an axis of rotation X, Y extending crookedly relative to the main axis H, wherein the axes of rotation X, Y each extend in a plane that is perpendicular to the main axis H. Both rollers 91, 93 have a respective circumferential groove 95, 97 extending at the respective outer circumference in which the tube 47 is received when used as intended. The rollers 91, 93 are rubberised in the region of the grooves 95, 97 and move the tube 47 by means of frictional connection. The distance between the rotational axes X, Y can be adjusted by way of an eccentric element (not shown) of the pressing roller 93 so that the contact pressure can be adjusted and/or tubes of different diameters can be moved by the advancing unit 21.

The rollers 91, 93 are part of a drive 94 of the advancing unit 21. The drive 94 further has a servomotor 99 that directly drives the drive roller 91. The rollers 91, 93 are coupled together via pinions 100 (only one pinion is shown) such that the pressing roller 93 is also driven. The servomotor 99 is connected to the controller of the cleaning device 1 and can be activated and deactivated by the controller. A monitoring device for detecting an insertion depth E of the tube 47 is integrated into the servomotor 99. The monitoring device senses the rotational angle of the servomotor 99.

The hollow shafts 37, 65, 71, the housing 23, and the guide sleeves 83, 85 together form a tube guide 101 for the tube 47. Starting from the end 45, the tube 47 extends sequentially through the first hollow shaft 37, through the first compression spring 39, through the first aperture 25, through the first guide sleeve 83, through the interior 81 of the housing 23, through the second guide sleeve 85, through the second aperture 27, through the second compression spring 70, through the second hollow shaft 65, and through the third hollow shaft 71. At the end 74 of the third hollow shaft 71, the tube 47 enters the open air and, when used as intended, is guided there into a pipe 12 to be cleaned. The cleaning device 1 is positioned such that the pipe 12 to be cleaned runs along the main axis H (see FIG. 2).

Between the guide sleeves 83, 85, the tube guide 101 is interrupted so that the rollers 91, 93 can contact the tube 47 and move it axially. The rollers 91, 93 clamp the tube 47 between their circumferential grooves 95, 97 and are thereby frictionally connected to the tube 47. A rotation of the drive roller 91 thus results in an axial movement of the tube 47 in the tube guide 101 along the main axis H. When used as intended, the tube 47 is thus set into an axial movement by means of the drive 94.

A nozzle (not shown) is attached to the tip 103 of the tube 47. The nozzle has a larger cross-section than the tube 47. The nozzle arranged at the tip of the tube 47 has eccentrically arranged exit holes for cleaning water.

A spherical first abutment element 104 can be attached to the region of the tube 47 that lies in front of the first hollow shaft 37. The first abutment element 104 is part of the first end switch unit. To create redundancy, a plurality of abutment elements 104 can also be provided. The abutment element 104 acts as an end stop for the axial movement of the tube 47. When the tube 47 is moved into the pipe 12 to be cleaned along the main axis H and such an abutment element 104 is positioned at the appropriate position on the tube 47, the abutment element 104 strikes the first hollow shaft 37 when the tube 47 is at a first end position. The first end position is defined by the position of the first abutment element 104 on the tube. The first abutment element 104 then pushes the first hollow shaft 37 in the axial direction against the first compression spring 39 towards the housing 23 (see FIG. 3). The first compression spring 39 is thereby compressed and the first recess 55 is moved away from the first sensor 53. The first sensor 53 detects this movement in that its signal changes because it is now aimed directly at the peripheral surface of the first hollow shaft 37. In this way, it is determined that the tube has reached the first end position. The controller of the cleaning device 1 receives the changed signal from the first sensor 53 as an end switch signal and stops the servomotor 99 such that the tube 47 is not moved further into the pipe 12. The axial movement of the tube 47 is terminated in this manner.

When the cleaning device 1 is put into service, the tube 47 is manually moved from the first hollow shaft 37 through the tube guide 101 until the tube 47 enters the open air at the end 74 of the third hollow shaft 71. From there, it can be moved into the pipe 12 and can clean its inside.

If the tube 47 is moved out of the pipe 12 after a cleaning operation, it should only be moved back to a predetermined point by the drive 94. In particular, it should be prevented that the tube 47 falls completely out of the advancing unit 21. For this purpose, the tube guide 101 in the region of the spacer 67 is interrupted. A fork-shaped stopper part 105 of the second end switch can be stuck on the tube 47 in the spacer 67. The stopper part 105 is then secured by a cover of the spacer 67, which prevents the stopper part 105 from slipping off the tube 47. The stopper part 105 has a clear width that is greater than the outer diameter of the tube 47, but less than the outer diameter of the nozzle. As the tube 47 retracts out of the pipe 12, the nozzle strikes the stopper part 105; the tube 47 has now reached its second end position. The nozzle forms the abutment element of the second end switch unit. The stopper part 105 is pushed by the nozzle in the axial direction against the second hollow shaft 65 and moves the second hollow shaft 65 axially towards the housing 23 against the force of the second compression spring 70. In this way, the second sensor aperture 57 is moved away from the second sensor 58. The second sensor 58 detects this movement in that its signal changes because it is now no longer aimed at the second recess 59, but directly towards the outer peripheral surface of the second hollow shaft 65. In this way, it is determined that tube 47 has reached the second end position. The controller of the cleaning device 1 receives the changed signal from the second sensor 53 as an end switch signal and stops the servomotor 99 such that the tube 47 is not moved further. At this time, the tube 47 is completely outside the pipe 12, but is not moved further into the tube guide 101 and thus cannot fall out of the advancing unit 21.

In other embodiments, a second fork-shaped stopper part can be provided between the inside 87 and the second guide block 61. This creates redundancy. The second fork-shaped stopper part can also be configured merely as a tube catcher and not an end switch. As a result, no additional sensor is required, and the second fork-shaped stopper part still serves as an additional safety in order to prevent the tube from exiting the tube guide under pressure.

The controller continuously determines a distance A from the insertion depth E of the tube 47 and a target value. A target value is associated with each end position. The direction of rotation of the rollers 91, 93 determines to which end position the tube 47 is moving. The distance A is the distance of the tube 47 from the end position in whose direction it is moving. The controller can then set the advancing speed, i.e. the speed of rotation of the servomotor, as a function of the distance A.

Figure 4:
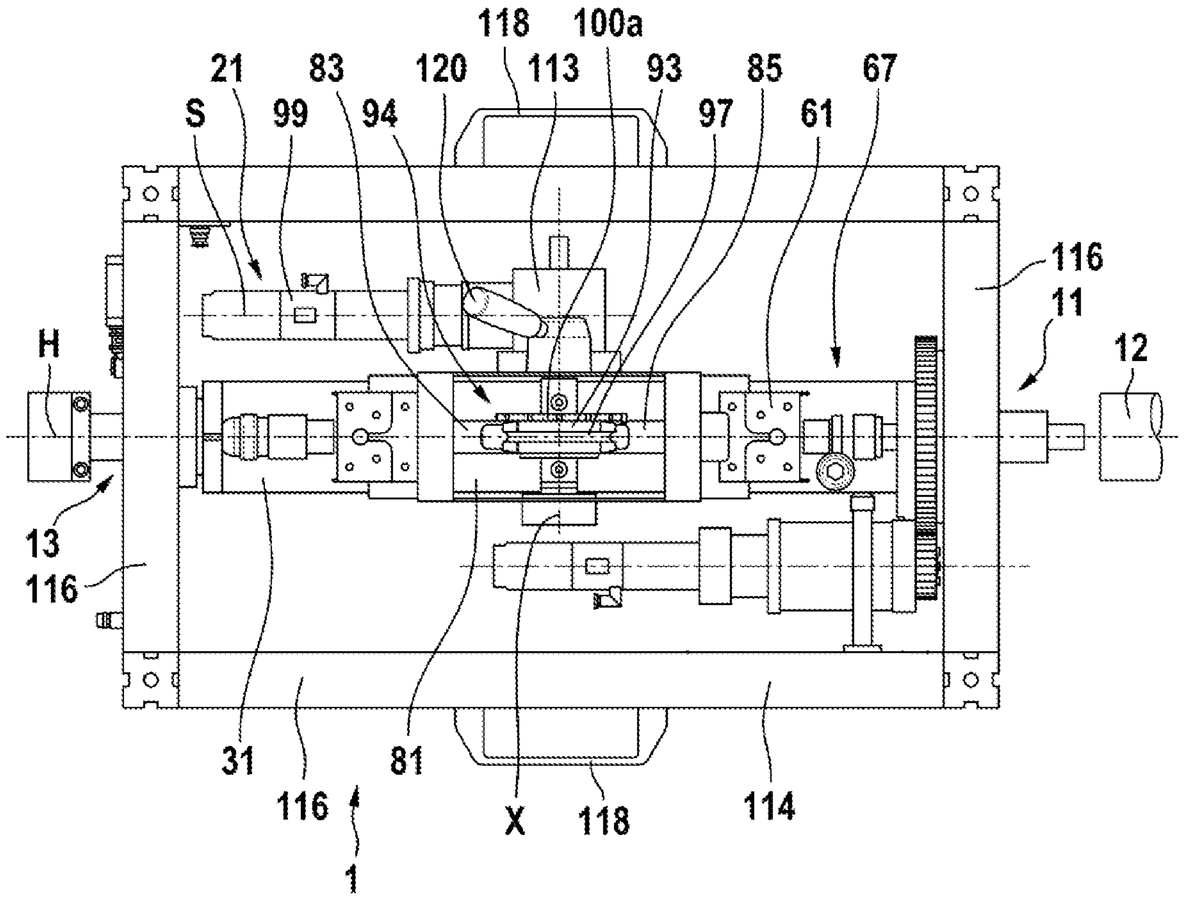
FIG. 4 a second embodiment of the device according to the invention in a plan view.

FIG. 4 shows a second embodiment of the cleaning device 1 according to the invention. This embodiment corresponds in portions to the first embodiment.

In this embodiment, the servomotor 99 is arranged on the advancing unit 21 such that its servomotor axis S is perpendicular to the axis of rotation of the drive roller (neither are visible here). More specifically, in this embodiment, the servomotor axis S of the drive is aligned parallel to the main axis H. This gives the cleaning device a compact design. The servomotor 99 includes a transmission 113 for redirecting the drive torque from the servomotor 99 to the drive roller 91.

In this embodiment, the post of the cleaning device 1 is built into a frame construction 114. The frame construction 114 is cuboid and has a plurality of frame portions 116. The frame portions 116 run along the edges of an intended cuboid.

In the front region 11 and the rear region 13, the frame construction 114 is closed at its front sides by a respective plate. In the front region 11, this prevents soil from the pipe 12 reaching the components of the cleaning device 1. Two carrying handles 118 are arranged on opposite sides of the frame construction 114.

The distance between the axis of rotation of the drive roller and the axis of rotation X of the pressing roller 93 can be adjusted by way of an eccentric element with a handle 120. With the eccentric element 120, the pressing roller 93 is moved with its axis of rotation X relative to the axis of rotation of the drive roller. In this way, the contact pressure can be adjusted, and/or tubes having different diameters can be moved through the advancing unit 21.

LIST OF REFERENCE NUMERALS

- 1 Cleaning device
- 3 Post
- 5 Base
- 7 Pillar
- 9 Bracket
- 11 Front region
- 12 Tube
- 13 Rear region
- 15 Plastic bushing
- 17 Plastic block
- 21 Advancing unit
- 23 Housing
- 25 First aperture
- 27 Second aperture
- 29 Outside
- 31 First guide block
- 35 First guide bore
- 37 First hollow shaft
- 38 First bushing
- 39 First compression spring
- 43 Bore
- 45 End
- 47 Tube
- 51 First sensor bore
- 53 First sensor
- 55 First recess
- 57 Second sensor bore
- 58 Second sensor
- 59 Second recess
- 61 Second guide block
- 63 Second guide bore
- 65 Second hollow shaft
- 67 Spacer
- 69 Second bushing
- 70 Second compression spring
- 71 Third hollow shaft
- 73 Bore
- 74 End
- 81 Interior
- 83 First guide sleeve
- 85 Second guide sleeve
- 87 Inside
- 91 Drive roller
- 93 Pressing roller
- 94 Drive
- 95 Circumferential groove
- 97 Circumferential groove

99 Servomotor
100 Pinion
101 Tube guide
103 Tip
104 Stop member
105 Abutment part
113 Transmission
114 Frame construction
116 Frame part
118 Handle
120 Eccentric element with handle
H Main axis
S Servomotor axis
X Axis of rotation
Y Axis of rotation

What is claimed is:

1. A method for cleaning an interior of a pipe using a cleaning device which has a tube, an end switch unit, and a controller, comprising the steps of:
   - setting the tube of the cleaning device into an axial movement along a main axis H within the pipe,
   - detecting an insertion depth E of the tube of the cleaning device into the pipe,
   - advancing the tube of the cleaning device to reach an end position,
   - determining, by the controller, that the tube of the cleaning device has reached the end position in response to a signal transmitted from the end switch unit to the controller, and terminating, by the controller, the axial movement of the tube in response to the signal,
   - wherein the end switch unit comprises a shaft with a recess at which a sensor is aimed, and the signal is transmitted when the recess is moved away from the sensor.

2. The method for cleaning the interior of the pipe according to claim 1, wherein the end position is a first end position in which the tube at least partially extends into the pipe or a second end position in which the tube is located completely outside the pipe.

3. The method for cleaning the interior of the pipe according to claim 1, wherein during the axial movement, the controller continuously determines a distance A of the tube from a target value associated with the end position in whose direction the tube moves, wherein an advancing speed of the tube is set to a constant first value W1 at a distance of A >50 cm and to a constant second value W2<W1 at a distance of A≤50 cm.

4. The method for cleaning the interior of the pipe according to claim 1, wherein during the axial movement, the controller continuously determines a distance A of the tube from a target value associated with the end position in whose direction the tube moves, wherein an advancing speed of the tube is set to a constant first value W1 at a distance of A>50 cm and to a second value W2 at a distance of A≤50 cm, wherein the second value W2 is selected as a function of the distance A and decreases with decreasing distance A.

5. The method for cleaning the interior of the pipe according to claim 4, wherein a lower limit of 0.5·W1 is provided for the second value W2.

6. The method for cleaning the interior of the pipe according to claim 1, wherein an advancing speed of the tube is between 1 mm/s and 500 mm/s.

7. The method for cleaning the interior of the pipe according to claim 1, wherein, after determining that the tube of the cleaning device has reached the end position, the controller determines whether the insertion depth E is within a specified tolerance range around a target value associated with the end position, and at least one of the following actions is performed if the detected insertion depth E is outside of the tolerance range:
   - the target value is redefined based on the detected insertion depth E;
   - an entry is stored in a database indicating that the detected insertion depth E was outside the tolerance range;
   - a perceptible signal is output;
   - the cleaning of the interior of the pipe is discontinued.

8. The method for cleaning the interior of the pipe according to claim 2, wherein during the axial movement, the detected insertion depth E is used by the controller in order to continuously determine a distance A of the tube from a target value associated with the end position in whose direction the tube moves, and an advancing speed of the axial movement is set as a function of the determined distance A, and wherein the advancing speed is set to a constant first value W1 at a distance of A>50 cm and to a constant second value W2<W1 at a distance of A≤50 cm.

9. The method for cleaning the interior of the pipe according to claim 2, wherein during the axial movement, the detected insertion depth E is used by the controller in order to continuously determine a distance A of the tube from a target value associated with the end position in whose direction the tube moves, and an advancing speed of the axial movement is set as a function of the determined distance A, and wherein the advancing speed is set to a constant first value W1 at a distance of A>50 cm and to a second value W2<W1 at a distance of A≤50 cm, wherein the second value W2 is selected as a function of the distance A and decreases with decreasing distance A, wherein a lower limit of 0.5 W1 is provided for the second value W2, and wherein the advancing speed is between 1 mm/s and 500 mm/s.

10. A method for cleaning an interior of a pipe using a cleaning device which has a tube, comprising the steps of:
   - setting the tube of the cleaning device into an axial movement along a main axis H within the pipe,
   - detecting an insertion depth E of the tube of the cleaning device into the pipe, and
   - determining whether the tube of the cleaning device has reached an end position and terminating the axial movement when the tube of the cleaning device reaches the end position,
   - wherein, during the axial movement, the detected insertion depth E is used in order to continuously determine a distance A of the tube from a target value associated with the end position in whose direction the tube moves, and an advancing speed of the axial movement is set as a function of the determined distance A, wherein either
   - a) the advancing speed is set to a constant first value W1 at a distance of A>50 cm and to a constant second value W2<W1 at a distance of A≤50 cm, or
   - b) the advancing speed is set to a constant first value W1 at a distance of A>50 cm and to a second value W2 at a distance of A≤50 cm, wherein the second value W2 is selected as a function of the distance A and decreases with decreasing distance A.

* * * * *